(12) United States Patent
Mizuno et al.

(10) Patent No.: US 7,549,671 B2
(45) Date of Patent: Jun. 23, 2009

(54) KNEE-PROTECTING AIRBAG APPARATUS

(75) Inventors: Takao Mizuno, Aichi-ken (JP); Kazuaki Bito, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 174 days.

(21) Appl. No.: 11/657,619

(22) Filed: Jan. 25, 2007

(65) Prior Publication Data
US 2007/0182134 A1 Aug. 9, 2007

(30) Foreign Application Priority Data
Feb. 3, 2006 (JP) ............................... 2006-026705

(51) Int. Cl.
*B60R 21/16* (2006.01)
(52) U.S. Cl. .............. 280/730.1; 280/730.2; 280/743.1; 180/271; 296/68.1
(58) Field of Classification Search ................ 296/68.1; 180/271; 280/730.1, 730.2, 735, 743.1
See application file for complete search history.

(56) References Cited
U.S. PATENT DOCUMENTS 5,906,395 A * 5/1999 Isaji et al. ................ 280/743.1
6,155,598 A * 12/2000 Kutchey ................... 280/730.2
6,217,059 B1 * 4/2001 Brown et al. .............. 280/730.2
2002/0171230 A1* 11/2002 Takimoto et al. .......... 280/730.1
2003/0107206 A1* 6/2003 Takimoto et al. .......... 280/730.1

FOREIGN PATENT DOCUMENTS
JP A-2002-37003 2/2002

* cited by examiner

Primary Examiner—John Q. Nguyen
Assistant Examiner—James English
(74) Attorney, Agent, or Firm—Posz Law Group, PLC

(57) ABSTRACT

A knee-protecting airbag apparatus includes an airbag folded and housed in the lower side of column cover. Airbag is attached to a housing with inflator at a position in its column cover side wall which wall is deployed toward column cover upon airbag inflation. When folded and housed in the housing, airbag is folded in such a manner as to turn a boundary region of driver's side wall and column cover side wall, which region is deployed forward of inflator at the complete inflation of airbag, in between inflator and driver's side wall to reduce the longitudinal width of airbag.

11 Claims, 15 Drawing Sheets

KNEE-PROTECTING AIRBAG APPARATUS

The present application claims priority from Japanese Patent Application No. 2006-026705 of Mizuno et al., filed on Feb. 3, 2006, the disclosure of which is hereby incorporated into the present application by reference.

BACKGROUND OF THE INVENTION

1. Field of the Invention

The present invention relates to a knee-protecting airbag apparatus equipped with an airbag which is housed in a folded state in a lower side of the column cover covering the steering column.

2. Description of the Related Art

A knee-protecting airbag apparatus located in a lower side of the column cover is shown in JP 2002-37003. In this airbag apparatus, an airbag folded and housed inside the apparatus inflates with inflation gas from an inflator and protrudes rearward from the lower side of the column cover for protecting knees of a driver.

The steering column is disposed proximate knees of the driver seated in the driver's seat, and so is the knee-protecting airbag apparatus located in the lower side of the column cover. Accordingly, it is desired that the airbag protrudes as less rearward as possible in the initial stage of airbag inflation.

SUMMARY OF THE INVENTION

The object of the present invention is to provide a knee-protecting airbag apparatus wherein the rearward protruding amount (volume, height) and protruding speed of an airbag is restrained in the initial stage of airbag inflation for smooth protection of driver's knees.

In order to achieve the above object, the present invention provides a knee-protecting airbag apparatus including an airbag folded and housed in a lower side of a column cover covering a steering column and an inflator for supplying inflation gas to the airbag, when fed with inflation gas from the inflator, the airbag projecting from a housing disposed in the lower side of the column cover and developing and inflating such that it covers the lower side of column cover for protecting knees of a driver, the inflator being housed inside the airbag at a position to be a generally middle position in the longitudinal direction of the airbag when the airbag is completely inflated, the airbag including a column cover side wall deployed toward the column cover and a driver's side wall deployed toward a driver's seat, respectively upon airbag deployment, and is attached to the housing at the side of the column cover side wall using the inflator, and in the airbag folded up to reduce the longitudinal width of the airbag, a front region of the airbag to be deployed forward of the inflator at a complete inflation of airbag is folded in such a manner as to insert a front end of the front region which front end corresponds to a boundary region of the driver's side wall and column cover side wall in between the inflator and the driver's side wall, thereby providing an inserted portion.

With the arrangements of the present invention, in the folding work of the airbag, the front region of the airbag to be deployed forward of the inflator at the complete airbag inflation is folded in such a manner as to turn the front end of the front region, i.e. the boundary region of the column cover side wall and driver's side wall, in between the inflator and the driver's side wall. In operation, when the inflation gas is discharged from the inflator, the airbag admits inflation gas, projects from the housing, and starts to inflate in such a manner as to push out the inserted portion forward while unfolding the same. Then the airbag completes inflation and covers the lower side of column cover. In other words, in the initial stage of deployment, the airbag inflates in such a manner as to project forward along the lower side of column cover, and then starts to increase its thickness in the state where it is considerably unfolded forward. That is, making the inserted portion projected forward conduces to suppress the airbag from protruding rearward i.e., obliquely downward and rearward or toward driver's knees, in the initial stage of airbag inflation. Thereafter, the airbag completes inflation in the state where it is considerably unfolded forward and with suppressed rearward speed. As a result, the airbag is prevented from pressing driver's knees unduly in the initial stage of inflation, and covers the lower side of column cover over a wide range for protecting the knees smoothly.

With the knee-protecting airbag apparatus according to the present invention, therefore, the rearward protruding amount (volume, height) and protruding speed of the airbag are restrained in the initial stage of airbag inflation so that driver's knees are smoothly protected by the completely inflated airbag.

It is further desirable in the airbag apparatus of the present invention that the lateral width of the airbag at the complete inflation is greater than that of the housing, and that, when the airbag is folded and housed, the lateral width of the airbag is reduced by folding back a left side region and a right side region of the airbag on the column cover side wall on a crease extending generally along the longitudinal direction.

With this arrangement, when unfolding, the left and right end regions of the airbag will not project toward the driver. More specifically, after unfolding nearly completely at the front side proximate the column cover and away from the driver, the folded-up left and right end regions inflate with inflation gas in a transversely extended state. Accordingly, the left and right ends of the airbag do not project toward the driver. In addition, it is also prevented that a central region of the airbag in the lateral direction thickly inflates and presses the driver's knees unduly in such a manner as to spraddle the knees rearward.

If the left side region and right side region of the airbag constructed as above are folded in a rolling manner from opposite lateral ends on the column cover side wall, upon airbag deployment, the left and right side regions unfold and develop along the lower side of the column cover. That is, the left and right side regions of the airbag firstly expand over a wide range in the lateral direction in a thin state, and then inflate thickly with inflation gas. This arrangement is advantageous since the airbag is further prevented from projecting toward a driver upon airbag deployment.

The airbag of the present invention desirably further includes a generally tubular inner tube formed of a flexible sheet material and disposed inside the airbag to enclose the inflator. The inner tube is preferably arranged along generally lateral direction when the airbag is completely inflated and includes outlet ports at its left and right ends for emitting the inflation gas discharged from the inflator.

With this arrangement, upon airbag deployment, the inflation gas discharged from the inflator inflates the inner tube firstly, and then is let out into the airbag from the left and right outlet ports of the inner tube, while being redirected toward the lateral ends of the airbag. Subsequently, the gas is redirected to the front and rear regions of the airbag. That is, the inner tube prevents the inflation gas from being directly fed rearward, i.e. obliquely downward and rearward or toward the driver's knees, inside the airbag. Moreover, since the inner tube guides the gas toward the lateral direction when supplying the gas into the airbag, the airbag will be expanded over a wide range in the lateral direction in the initial stage of airbag inflation. In addition, in the initial stage of inflation, the thickness of the airbag equates with that of the inflated inner tube. That is, the inner tube securely helps prevent the airbag from inflating thickly in the initial stage of inflation, and from pressing driver's knees unduly.

In the knee-protecting airbag apparatus constructed as above, it will also be appreciated that the outlet ports of the inner tube are located to the lateral ends of the airbag with respect to creases positioned farthest to the lateral ends out of the creases for folding back the left and right side regions of the airbag on the column cover side wall. With this arrangement, in the initial stage of airbag inflation, the inflation gas is suppressed from being further fed inside the airbag until the left and right regions almost complete unfolding, which allows the left and right side regions to unfold in an as thin state as possible.

In the above airbag apparatus, it is desired that the inner diameter of a central portion of the inner tube in the lateral direction is greater than that of the vicinity of the outlet ports. With this arrangement, when the inner tube inflates with inflation gas in the initial stage of airbag inflation, the central portion of the inner tube stably bulges since the left and right outlet ports are narrow, which helps bulge a central portion of the inserted portion of the airbag in the lateral direction. Accordingly, the inserted portion unfolds and inflates smoothly from its lateral end regions to the central region. Moreover, since the central portion of the inner tube bulges stably, the airbag will protect driver's knees with sufficient cushioning property in the event that the airbag butts against the knees in the initial stage of airbag inflation.

In the above airbag apparatus, it is desired that the inner tube includes a front region positioned forward of the inflator when the airbag is completely inflated, and that the inner tube is folded up together with the airbag in a state where the front region is arranged between the inserted portion and the column cover side wall with a front end of the front region oriented rearward.

With this arrangement, the inner tube is disposed inside the folded-up airbag with its front end oriented rearward. That is, the left and right gas outlet ports of the inner tube are positioned at as rear side as possible of the inserted portion. Accordingly, in the initial stage of airbag inflation, the inflation gas discharged from the inflator is fed forward at the vicinity of the rear end of the inserted portion through the opposite outlet ports, which helps push the inserted portion out forward. Consequently, the inserted portion is swiftly developed since it is firstly unfolded forward in the initial stage of airbag deployment.

It is further desired in the above airbag apparatus that, when the airbag is folded and housed, a rear region of the airbag arranged rearward of the inflator at the complete inflation of the airbag is folded in such a manner as to bring a rear end of the rear region close to the inflator, and the rear region thus folded is disposed above the front region of the inner tube.

With this arrangement, the front region of the inner tube is located below the folded rear region of the airbag when the airbag is folded and housed. When the inner tube is inflated with inflation gas in the initial stage of airbag inflation, the inflated inner tube presses the folded rear region of the airbag so that the rear region of the airbag is temporarily held from unfolding. Then the rear region projects downward from the housing and starts to deploy after the inserted portion is developed. As a result, in the initial stage of airbag inflation, the rear region of the airbag is prevented from projecting toward the driver's knees.

In the airbag apparatus as constructed as above, it will also be appreciated that the rear region of the airbag arranged rearward of the inflator at the complete inflation of the airbag is folded in a rolling manner from the rear end on the column cover side wall. With this arrangement, upon airbag deployment, the rear region unfolds and expands along the lower side of the column cover in a thin state, and then starts to admit inflation gas to increase its thickness. Therefore, the airbag is capable of being developed widely in the longitudinal direction in the thin state and then inflates thickly with inflation gas, so that the airbag securely protects driver's knees without pressing them unduly.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

As shown in FIGS. 1 to 4, a knee-protecting airbag apparatus S embodying the present invention is located on a lower side 8*a* of a column cover 8 covering a steering column 3 in front of a driver MD for protecting left and right knees K (KL and KR) of the driver MD.

Up-down, left-right (lateral direction), and front-rear (longitudinal direction) in this specification correspond to up-down, left-right, and front-rear of the vehicle with the airbag apparatus S mounted thereon.

The knee-protecting airbag apparatus S includes an airbag 26 housed in a folded state on lower side 8*a* of and inside column cover 8, an inflator 18 supplying airbag 26 with inflation gas, and a housing 13 housing and holding the folded airbag 26 and also attaching airbag 26 and inflator 18. In this specific embodiment, the side of the folded airbag 26 facing the interior of vehicle is covered by column cover 8.

Figure 1:
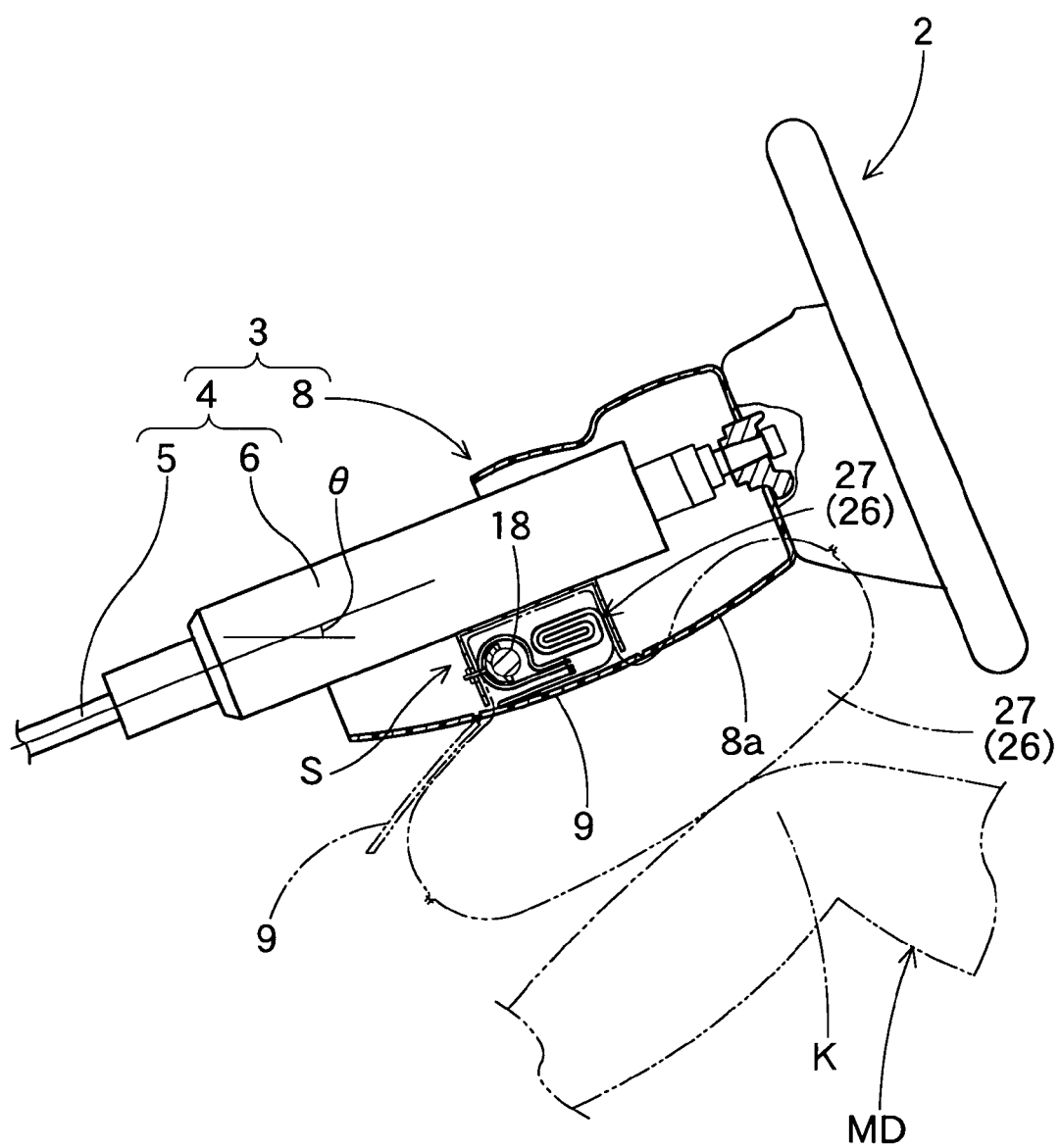
FIG. 1 is a schematic vertical section of a knee-protecting airbag apparatus embodying the present invention in service, taken along the longitudinal direction of vehicle.
Figure 2:
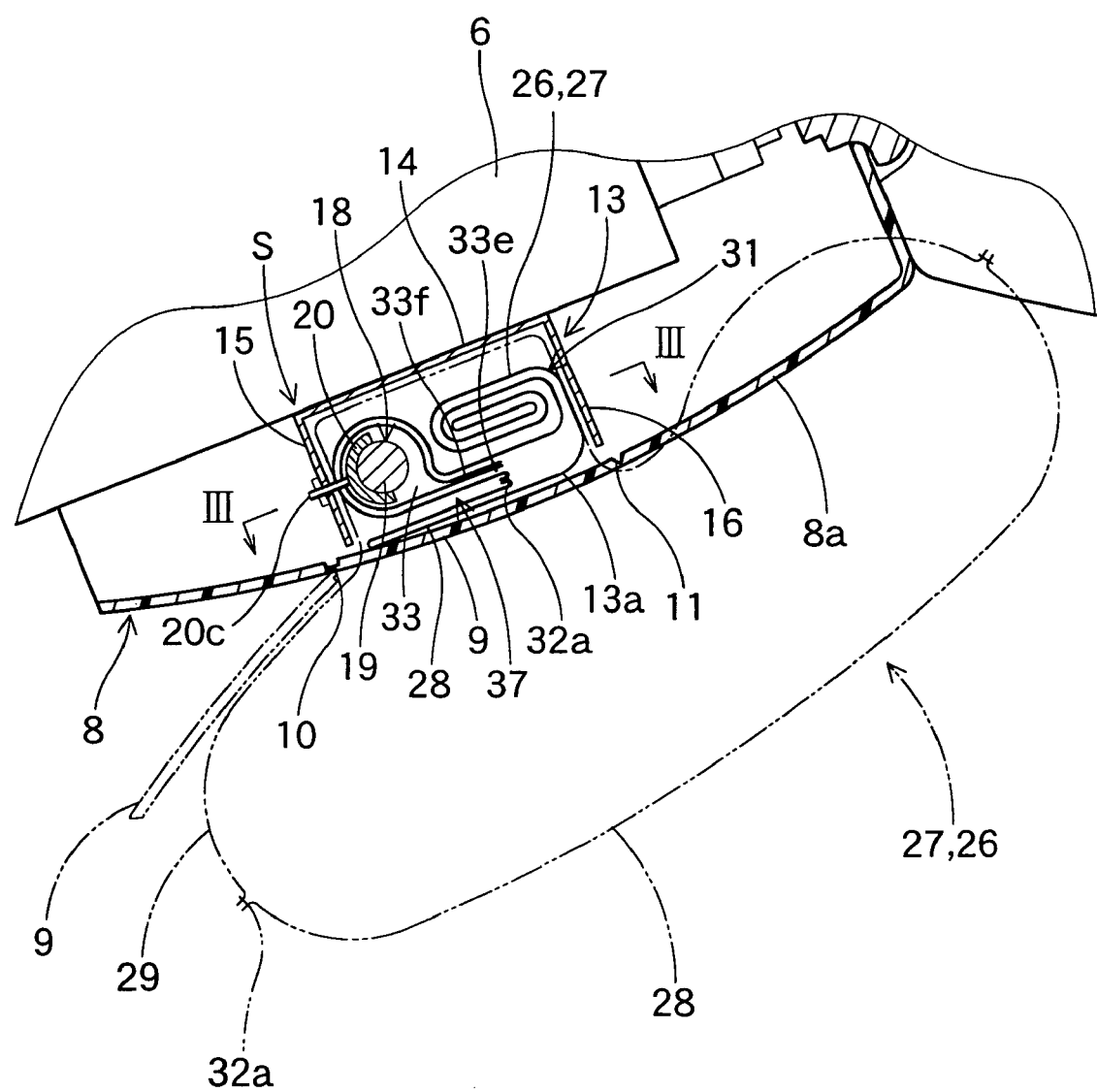
FIG. 2 is a schematic enlarged vertical section of the airbag apparatus of FIG. 1, taken along the longitudinal direction of vehicle.

As shown in FIGS. 1 and 2, steering column 3 includes a column body 4 connected to a steering wheel 2 and column cover 8 covering a portion of column body 4 below steering wheel 2. Column body 4 includes a main shaft 5 and a column tube 6 mounted around main shaft 5. As shown in FIG. 1, column body 4 is inclined so that its front side is located downward while its rear side located in upward where its gradient angle θ from the horizontal plane is 15 to 40° (about 20°, in the illustrated embodiment).

Figure 3:
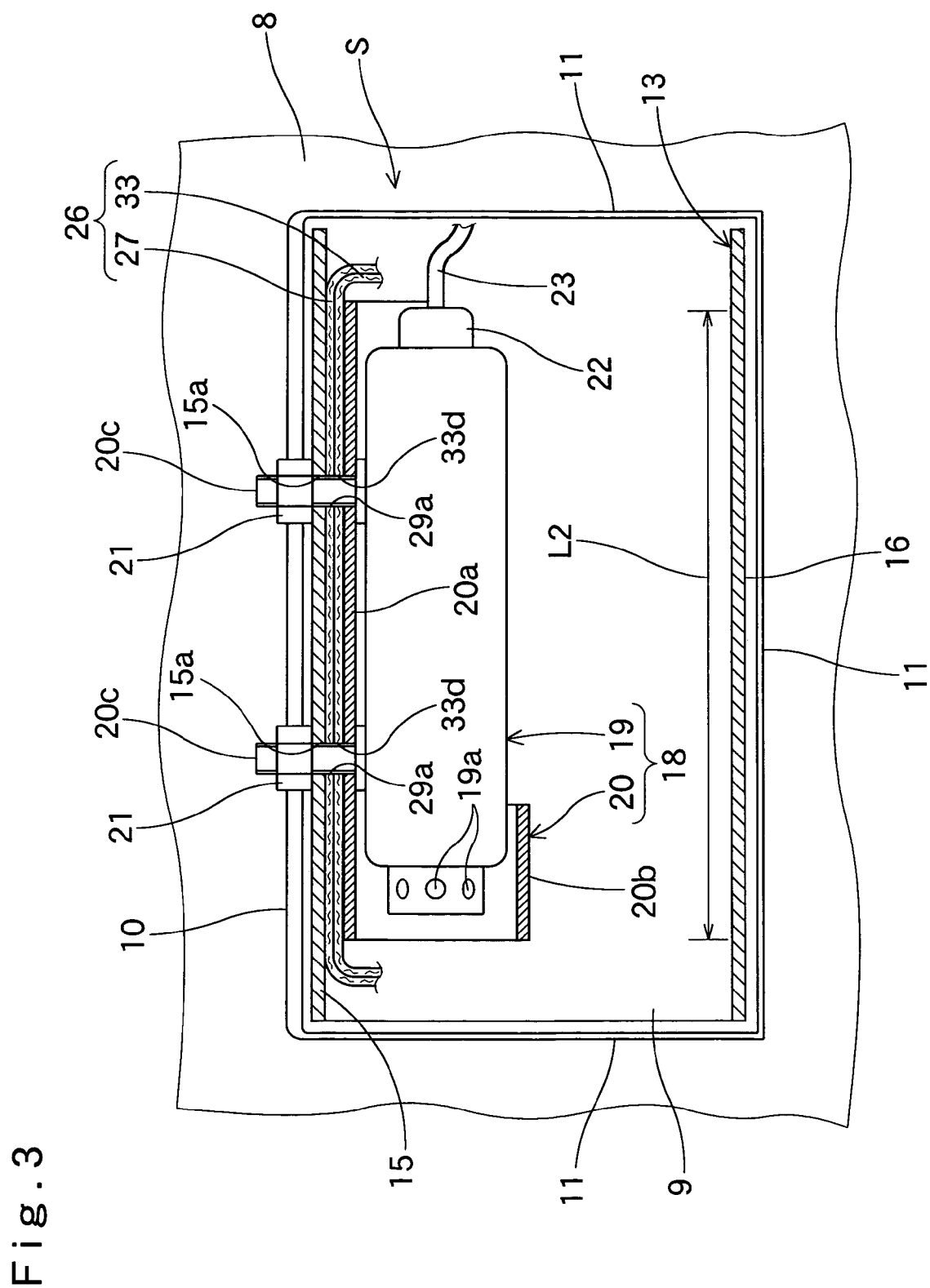
FIG. 3 is a schematic section taken along line III-III of FIG. 2.
Figure 4:
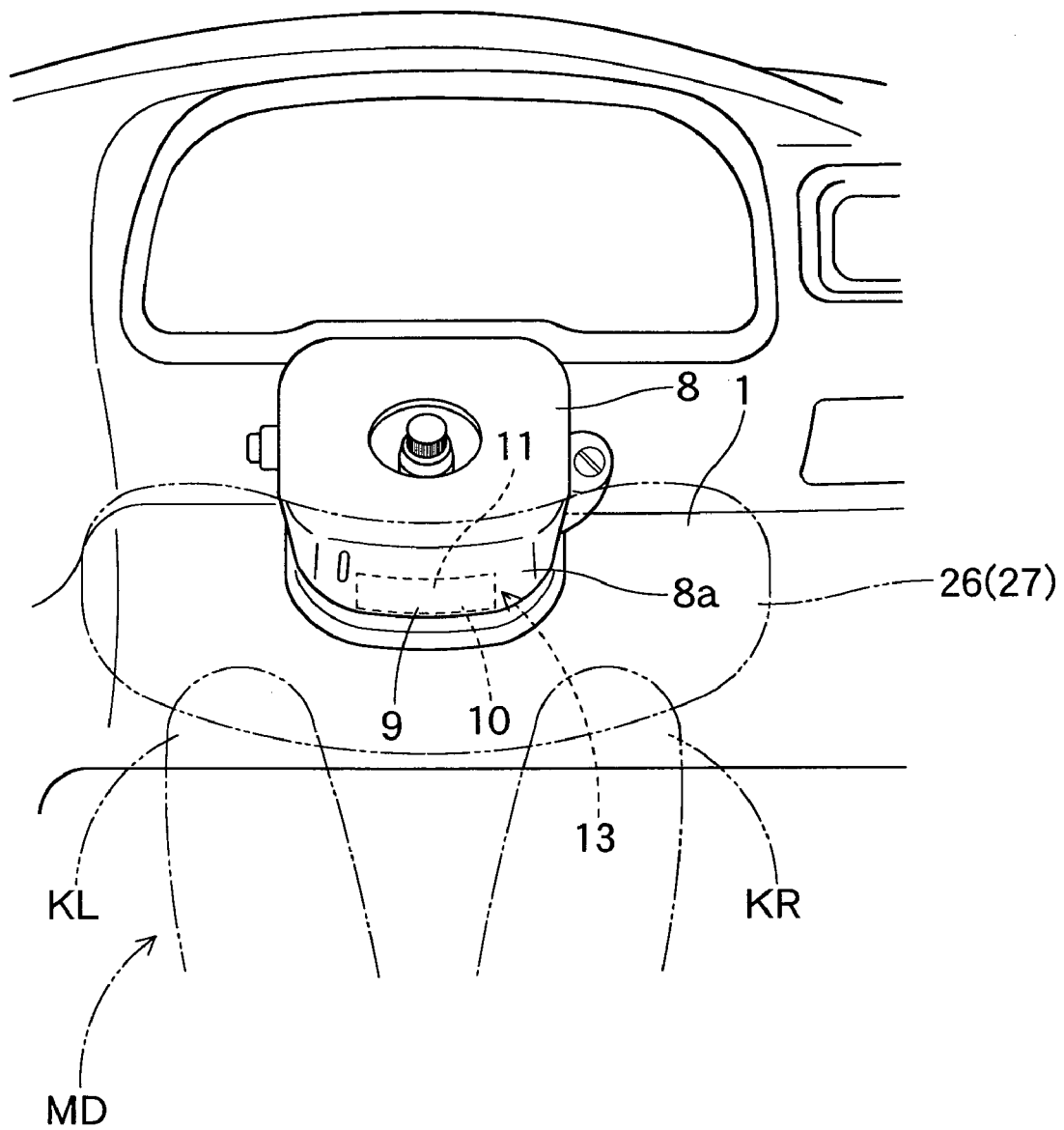
FIG. 4 is a schematic front view of the airbag apparatus of FIG. 1 in service, as viewed from rearward.

Column cover 8 is made from synthetic resin and has a generally square tubular shape. Column cover 8 is so arranged along the axial direction of column body 4 as to cover column body 4. A rear side or lower side 8a of a portion of column cover 8 protruded from an instrument panel 1 (FIG. 4) has a generally rectangular plate shape ascending rearward in a curved manner. In a position of lower side 8a of column cover 8 and beneath the folded and housed airbag 26, i.e., diagonally rearward and downward of airbag 26, is a door 9 openable upon airbag deployment. In this specific embodiment, door 9 has a generally rectangular plate shape corresponding to housing 13 and whose length direction extends laterally. As shown in FIGS. 2 and 3, door 9 is integral with column cover 8, and is provided at its front edge with a hinge portion 10 for the door to open around, and in its opposite lateral edges and rear edge with a breakable portion 11 which is breakable when door 9 is pushed by the inflating airbag 26. Although this specific embodiment shows column cover 8 including a single door 9, the column cover may have two doors openable backward and forward or to either side, or further alternatively, four doors openable toward front, rear, left and right.

Housing 13 is made of sheet metal. As shown in FIGS. 1 to 3, housing 13 is opened at opposite lateral sides and bottom, and accordingly has a generally inverted U-shaped section as taken along the longitudinal direction. Housing 13 includes an upper wall 14 arranged along column body 4 and a front wall 15 and rear wall 16 respectively extending downward from the front and rear edges of upper wall 14. Front wall 15 has two insert holes 15a disposed side by side along the lateral direction for receiving later-described bolts 20c of inflator 18. Housing 13 is secured to column tube 6 of column body 4 at upper wall 14 such that the leading end of front wall 15 is positioned in the vicinity of hinge portion 10 of column cover 8 whereas the leading end of rear wall 16 positioned proximate the rear end region of breakable portion 11 extending laterally. In the foregoing embodiment, the bottom opening of housing 13 provides an opening 13a allowing airbag 26 to protrude and deploy from when door 9 opens.

Referring to FIGS. 1 to 3, inflator 18 is formed into a cylindrical shape which arranges its axial direction along the vehicle's lateral direction. Inflator 18 includes a generally columnar body 19 and a diffuser 20. Inflator body 19 is provided at its first end with a plurality of gas discharge ports 19a. The second end of inflator body 19 is to be connected with a connector 22 from which a lead wire 23 extends for receiving actuating signals. Diffuser 20 includes a generally halved tubular holding portion 20a covering a front side of inflator body 19, a halved tubular diffusing portion 20b which is integral with holding portion 20a and covering the rear side of an area around gas discharge ports 19a of body 19, and a plurality of (two, in the illustrated embodiment) bolts 20c projected from holding portion 20a. Diffusing portion 20b redirects inflation gas discharged from discharge ports 19a of inflator body 19 toward left and right inside airbag 26.

Inflator 18 is actuated by an actuating signal fed through the lead wire 23 when an airbag actuating circuit mounted on the vehicle detects a frontal collision of vehicle. At this time, an unillustrated airbag apparatus mounted on steering wheel 2 is actuated simultaneously.

Figure 5:
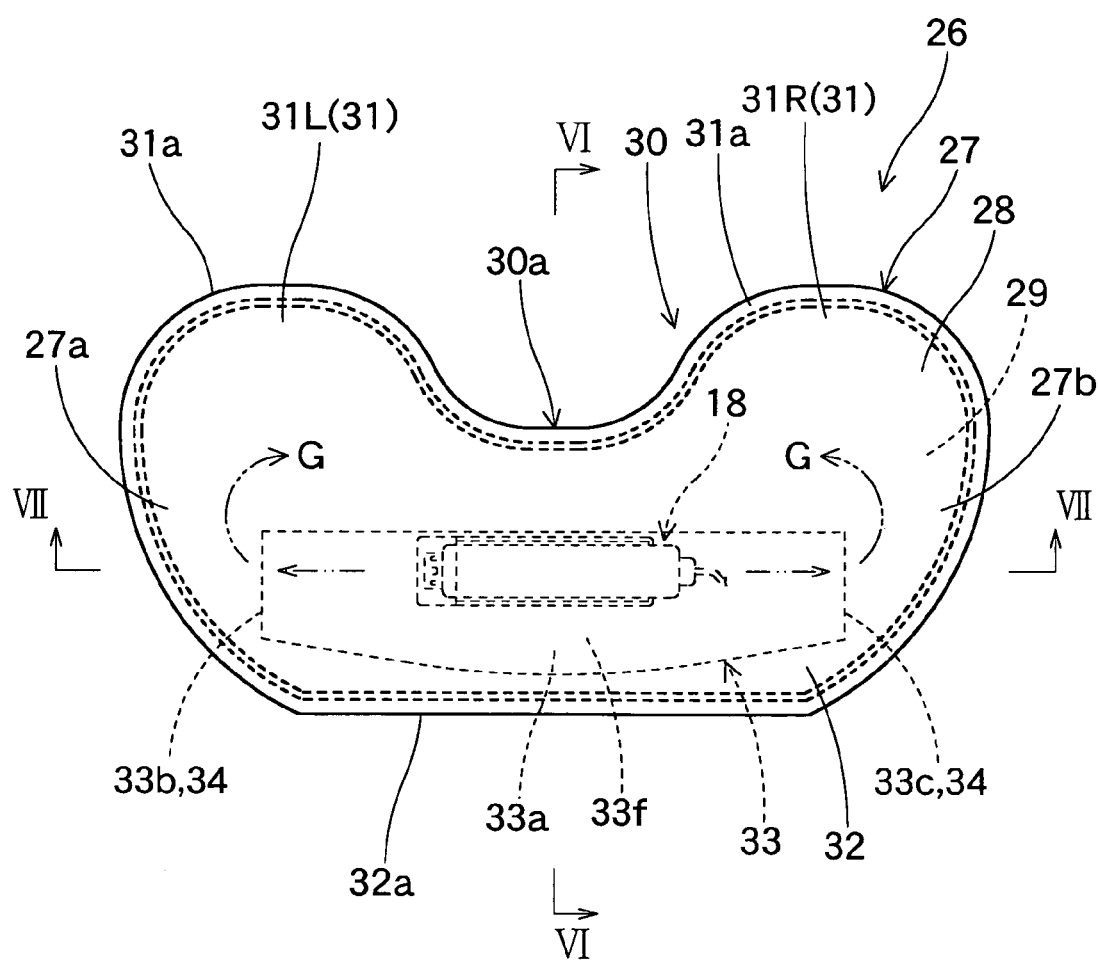
FIG. 5 is a front view of an airbag used in the airbag apparatus of FIG. 1.
Figure 6:
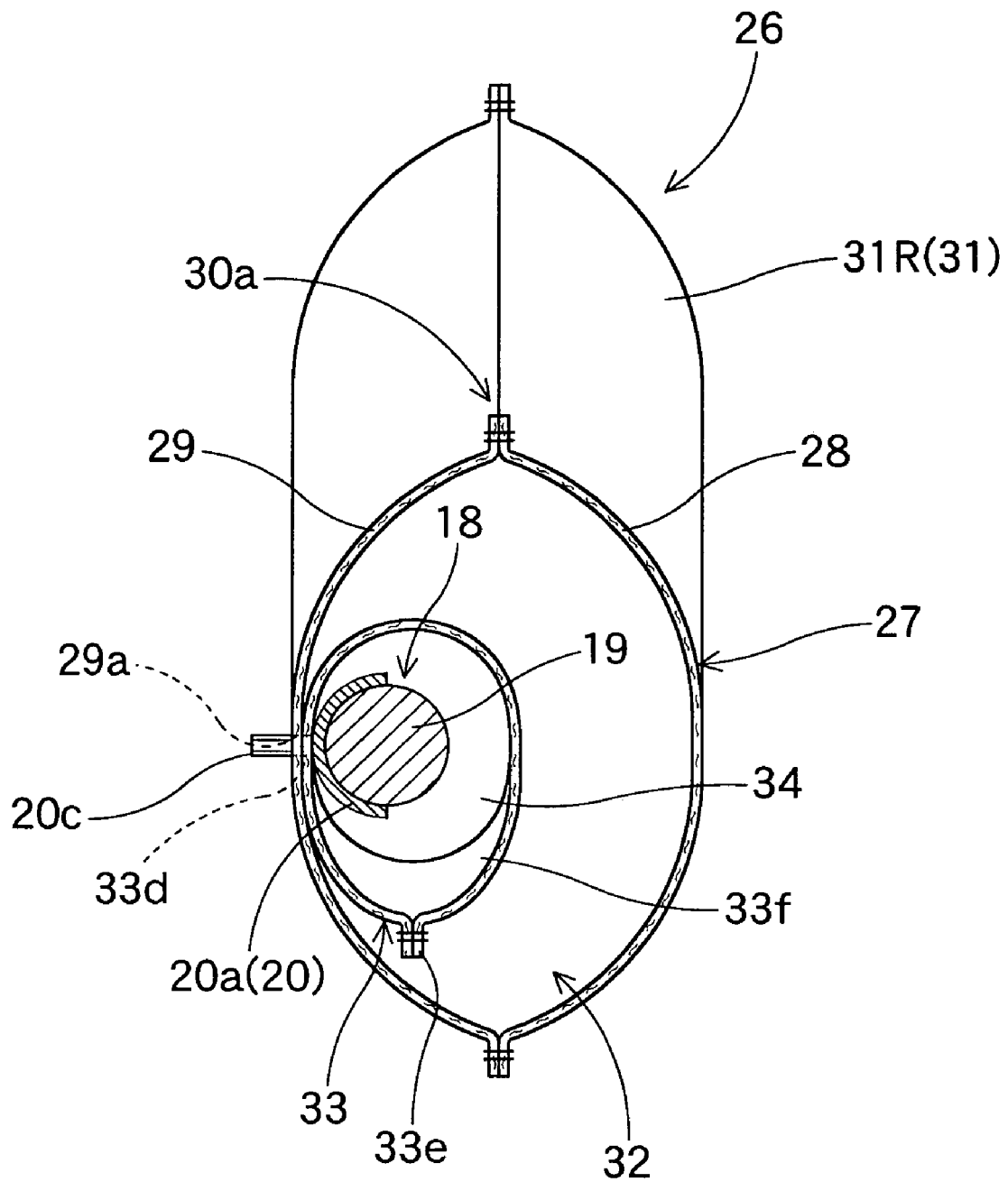
FIG. 6 is a schematic enlarged section taken along line VI-VI of FIG. 5.
Figure 7:
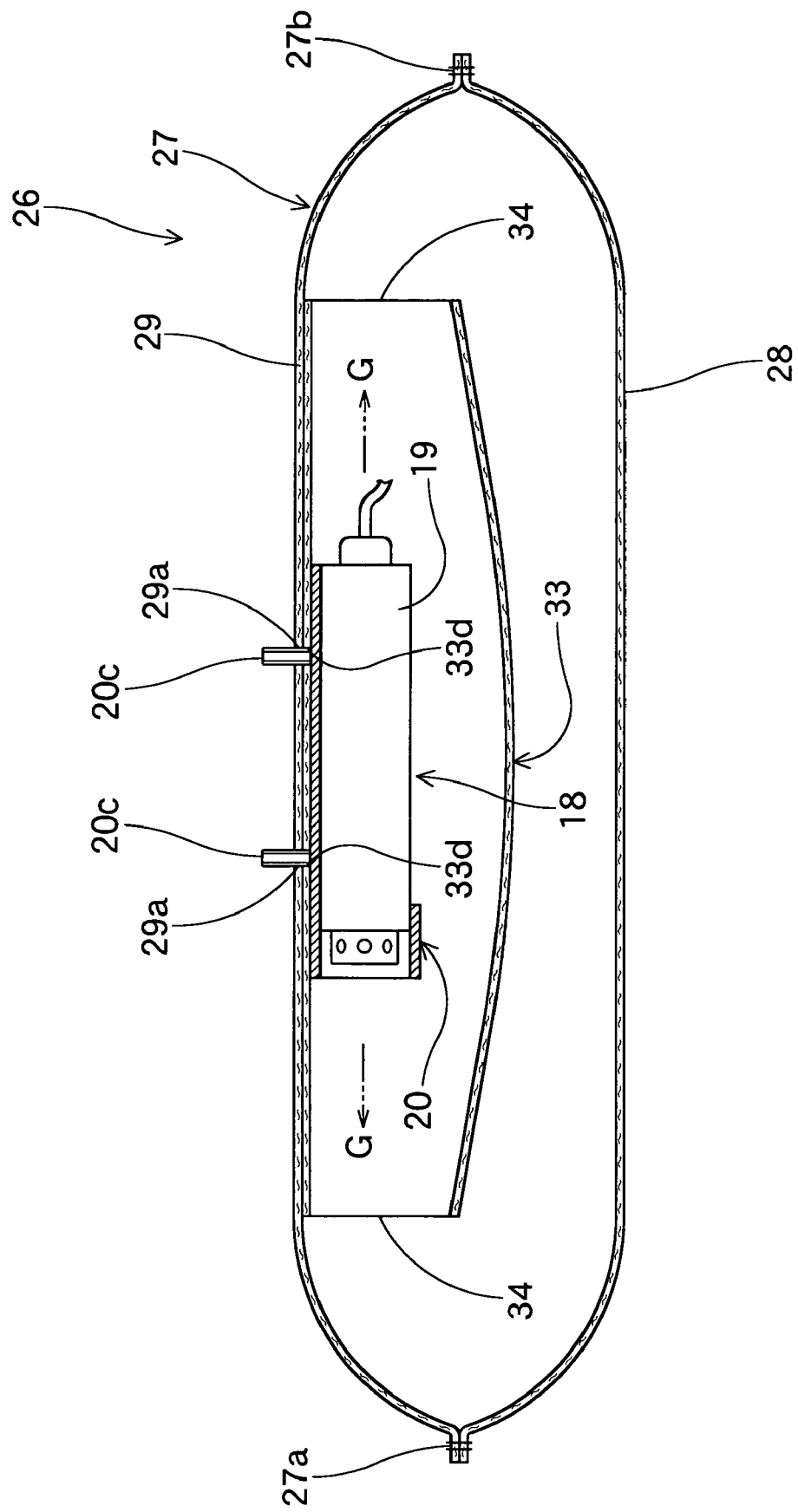
FIG. 7 is a schematic enlarged section taken along line VII-VII of FIG. 5.

Referring to FIGS. 5 to 7, airbag 26 is formed of flexible woven fabric of polyester, polyamide or the like, and includes a bag-shaped airbag body 27 and an inner tube 33 arranged inside airbag body 27.

As shown in FIGS. 1, 4, and 5 to 7, airbag body 27 is formed into a generally rectangular plate shape when inflated completely. The lateral width of airbag body 27 at complete inflation is greater than a lateral width of housing 13 so airbag body 27 protect both knees KL and KR of driver MD. Airbag body 27 is constructed of a driver's side wall 28 to be deployed toward driver MD and a column cover side wall 29 to be deployed toward vehicle body or column cover 8, respectively upon airbag deployment. Driver's side wall 28 and column cover side wall 29 have the same generally heart-shaped outer contours. Airbag body 27 is manufactured by sewing up the circumferential edges of driver's side wall 28 and column cover side wall 29.

Figure 8:
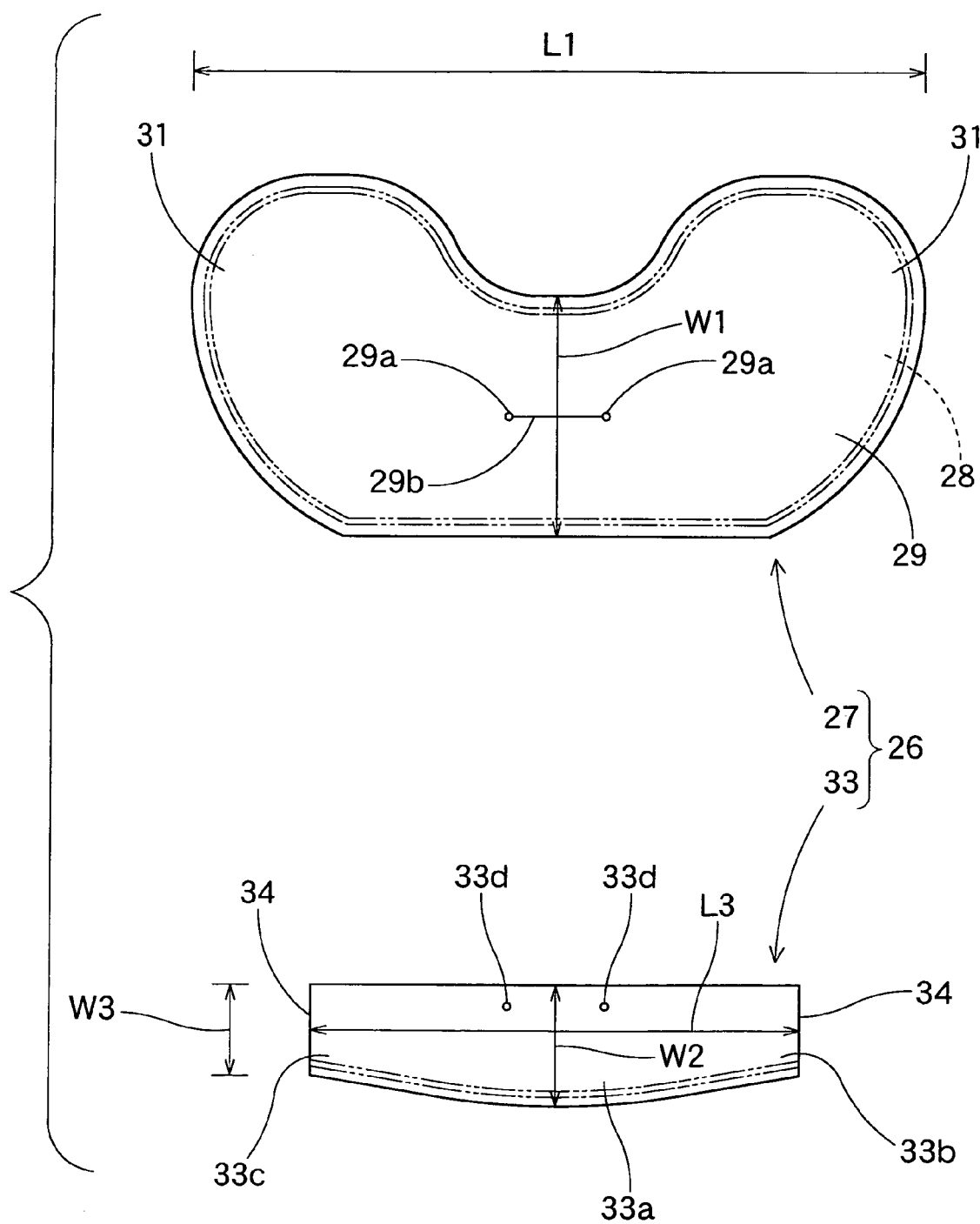
FIG. 8 illustrates an airbag body and an inner tube in a flattened state.

In a central region of column cover side wall 29 in the longitudinal and lateral directions are two insert holes 29a arranged side by side along the lateral direction for receiving bolts 20c of inflator 18. As shown in FIG. 8, column cover side wall 29 further includes a slit 29b extending generally along the lateral direction to connect insert holes 29a. Slit 29b is used to locate inflator 18, which inflator is preliminarily housed in inner tube 33, inside airbag body 27. Inflator 18 is located inside airbag 26 so that its bolts 20c project outside from insert holes 29a, then bolts 20c are put through insert holes 15a of front wall 15 of housing 13 and then fastened with nuts 21, thus airbag 26 and inflator 18 are secured to housing 13. Inflator 18 is disposed in the vicinity of the center of the completely inflated airbag body 27 in the longitudinal direction and lateral direction. In this specific embodiment, a rear region 30 of airbag body 27 arranged at the back of inflator 18 at the complete inflation of airbag is provided with a recessed portion 30a which is recessed forward at the lateral center so as to correspond to the contour of column cover 8. Areas of rear region 30 located on either side of recessed portion 30a serve as protection portion 31L and protection portion 31R for protecting knees K (KL and KR) of driver MD upon airbag inflation.

Figure 13A:
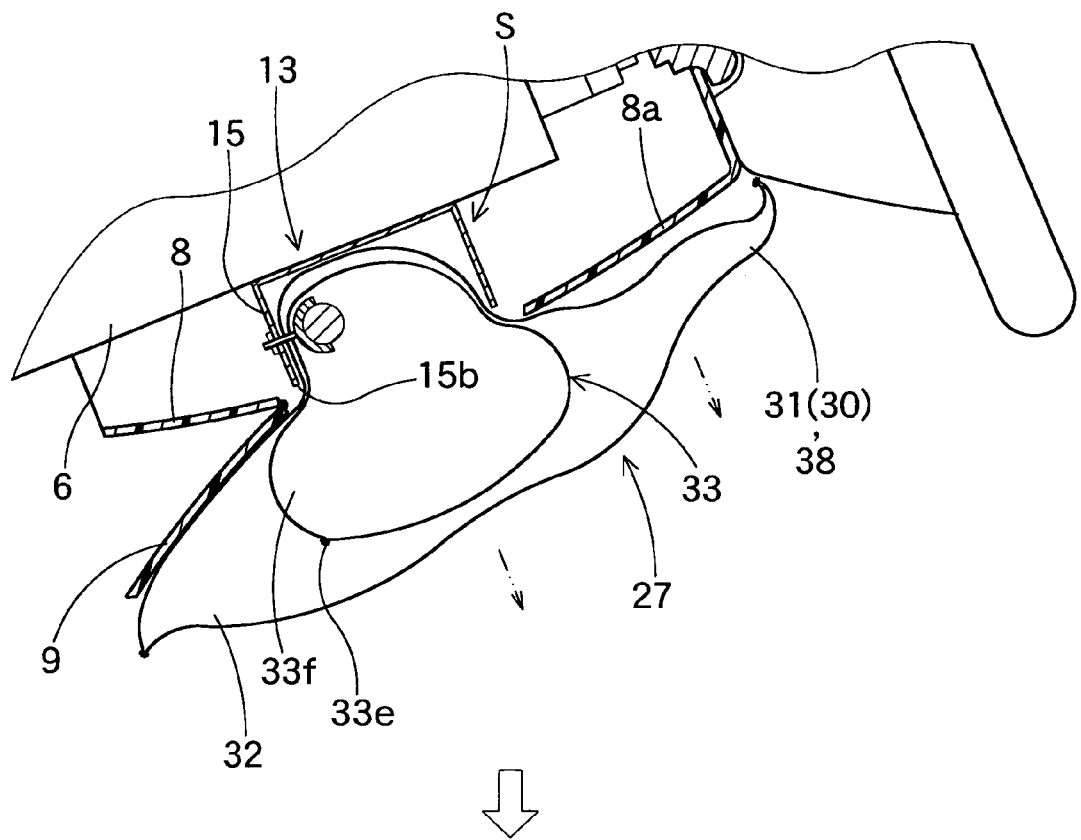
Figure 13B:
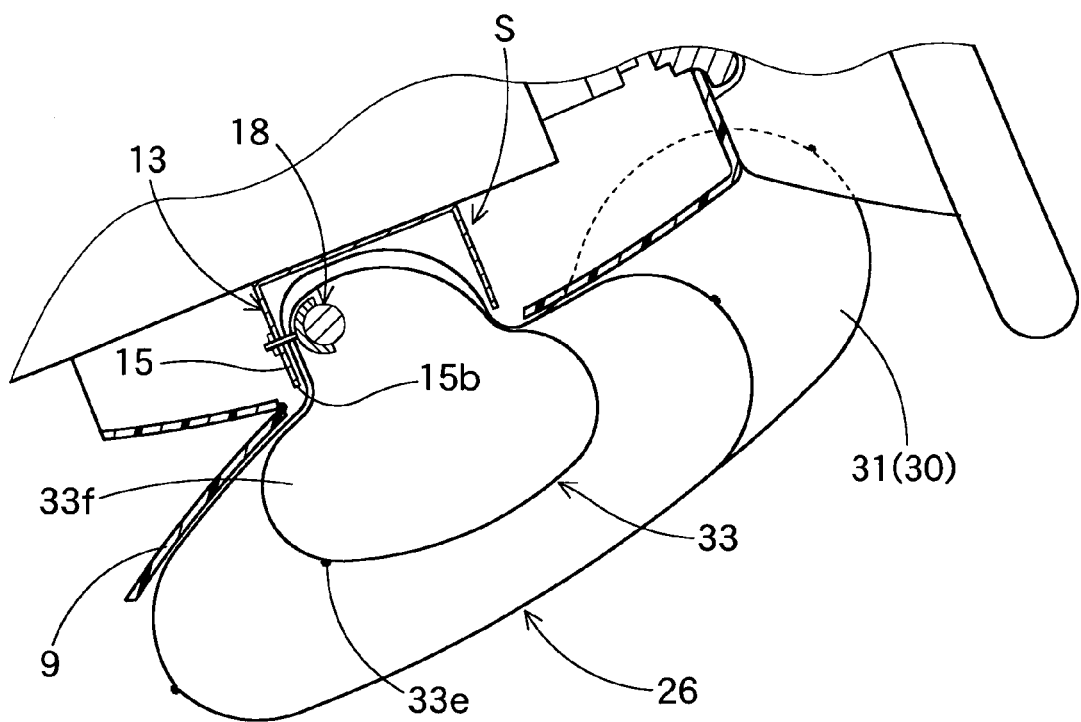

Inner tube 33 has a generally tubular shape and is located along the lateral direction inside airbag body 27 for covering inflator 18. In the foregoing embodiment, inner tube 33 are opened at opposite lateral ends so that left end 33b and right end 33c serve as outlet ports 34 for distributing inflation gas fed from inflator 18. Inner tube 33 is provided, in a region proximate its lateral center and arranged to face column cover side wall 29 when mounted on the vehicle, with two insert holes 33d arranged along the lateral direction for receiving bolts 20c of inflator 18. In the foregoing embodiment, when inner tube 33 is in a flattened state, insert holes 33d are arranged proximate the rear end of inner tube 33 (FIG. 8). Inner tube 33 includes a front region 33f protruded forward (forward and downward, in the foregoing embodiment) than inflator 18 when airbag 26 is completely inflated (FIGS. 5, 6, and 13). As shown in FIG. 13B, when airbag 26 is completely inflated, front region 33f is deployed to protrude forward of an end of front wall 15 of housing 13 at the opening side, i.e. the lower end 15b of front wall 15. The inner diameter of a central portion 33a of inner tube 33 which central portion is an area in the vicinity of the center of inner tube 33 in the lateral direction is greater than that of left end 33b and right end 33c i.e. the vicinity of outlet ports 34. In the foregoing embodiment, inner tube 33 is composed of a cloth member whose opposite edges in the width direction are bulged in a curved manner at central regions. The cloth member is folded back at the vicinity of the center of its width direction, and then the opposite edges are sewn up, thereby forming inner tube 33. When inner tube 33 is flattened and uninflated state, its portion in the vicinity of the lateral center in the front edge is protruded forward.

As shown in FIG. 8, in the flattened state, the length L1 of airbag body 27 in the lateral direction is 600 mm, whereas the width or longitudinal dimension W1 of the vicinity of the lateral center of airbag body 27 is 200 mm. As shown in FIG. 3, the length L2 of diffuser 20 of inflator 18 in the lateral direction is 200 mm. Back to FIG. 8, the length L3 of inner tube 33 in the lateral direction is 400 mm in the flattened state. Also in the flattened state, the width W2 of the vicinity of the lateral center i.e., central portion 33a of inner tube 33 is 100 mm, whereas the width W3 of the vicinity of outlet ports 34 is 75 mm.

Now described is how to mount knee-protecting airbag apparatus S on a vehicle. Firstly, airbag 26 is subjected to a folding work. More specifically, inflator 18 is housed inside airbag body 27 from slit 29b together with inner tube 33 such that bolts 20c project from insert holes 29a and 33d whereas the second end of inflator body 19 to be connected to connector 22 remains outside of airbag body 27, and airbag 26 is folded up in this state. In the foregoing embodiment, the folding work includes a lateral folding step where airbag 26 is folded with creases extending along generally lateral direction, and a vertical folding step where airbag 26 is folded with creases extending along generally longitudinal direction.

Figure 9A:
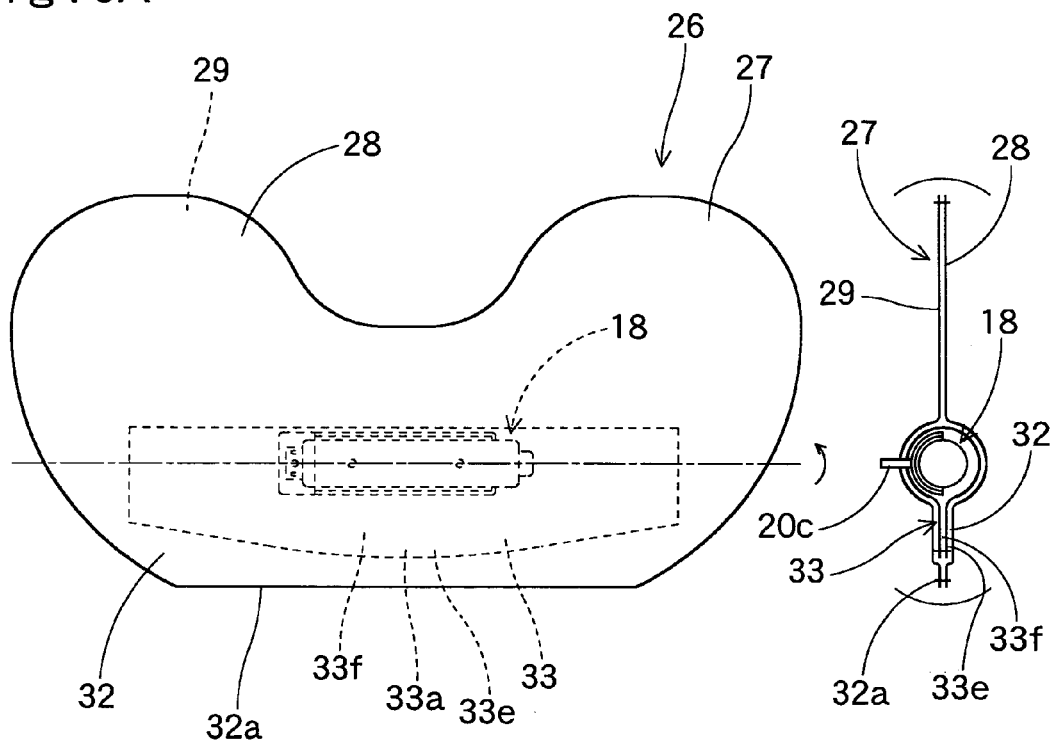
FIGS. 9A, 9B, 10A, 10B and 10C schematically illustrate the folding work of the airbag of FIG. 5 in order.
Figure 9B:
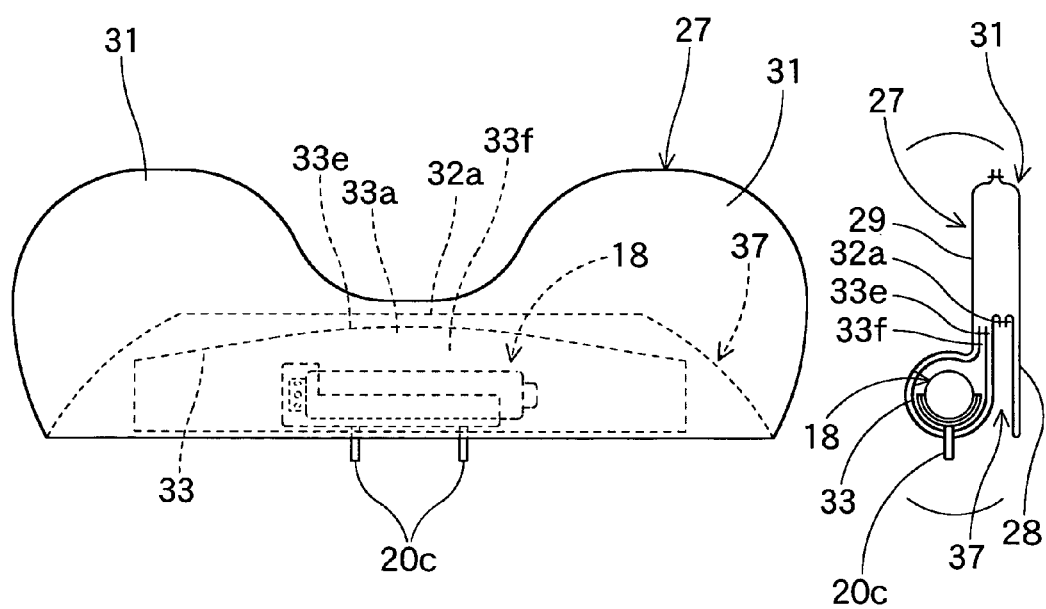
Figure 10A:
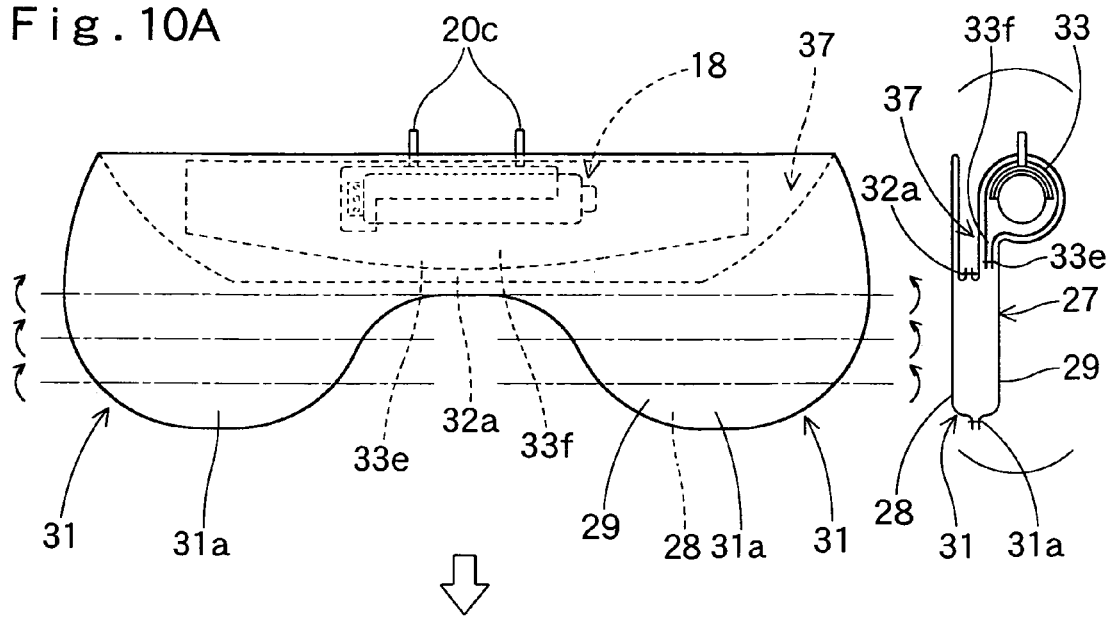
Figure 10B:
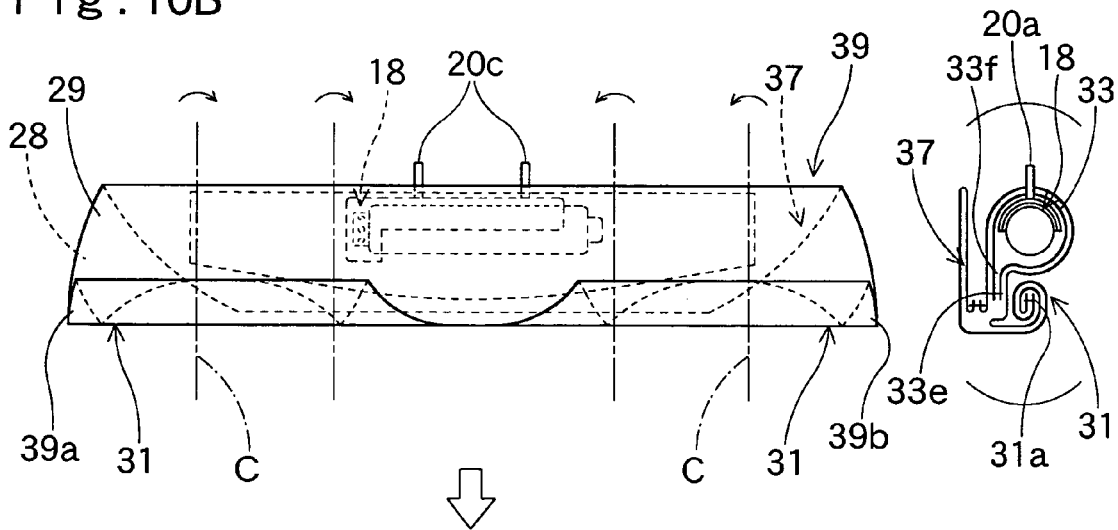

FIGS. 9A and 9B illustrate the lateral folding step. Firstly, a region of airbag body 27 located forward of inflator 18 when airbag body 27 is flattened and uninflated with inflator 18 housed therein, which region will be called front region 32 hereafter, is folded in such a manner as to turn a front edge or front end 32a i.e., a boundary region of driver's side wall 28 and column cover side wall 29, in between inflator 18 and driver's side wall 28. The crease on which airbag body 27 is folded runs proximate inflator 18 along the generally lateral direction on driver's side wall 28 and column cover side wall 29. This folding provides an inserted portion 37 (FIG. 9B). At this time, front region 33f of inner tube 33 is arranged between inserted portion 37 and column cover side wall 29 with its front end 33e oriented rearward. More specifically, front end 33e of front region 33f is located proximate the rear end of inserted portion 37. Thereafter, as shown in FIGS. 10A and 10B, left and right protection portions 31L and 31R are respectively folded in a rolling manner from their rear edges 31a on column cover side wall 29 on generally lateral creases, thereby providing a roll-folded portion 38. Thus airbag 26 is folded such that its longitudinal width fit in housing 13, and the lateral folding step is completed.

Figure 10C:
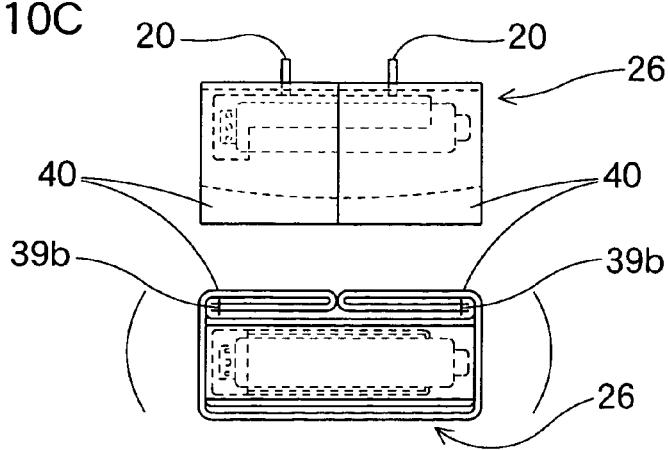

In the vertical folding step, the left side region 39a and right side region 39b of laterally-folded airbag 39 are folded in a rolling manner on column cover side wall 29 on generally longitudinal creases as shown in FIGS. 10B and 10C, thereby providing folded portions 40. Thus airbag 26 is folded up such that its lateral width fit in housing 13, and the vertical folding step and whole folding work of airbag 26 is completed. Then a breakable wrapping member (not shown) is used to wrap up the folded airbag 26 for keeping the folded-up configuration. At this time, bolts 20c of inflator 18 are left projected from the wrapping member as well as the second end of inflator body 19 to be connected to connector 22.

Subsequently, bolts 20c of inflator 18 are put through insert holes 15a formed on front wall 15 of housing 13 which housing is secured to column tube 6 beforehand, for nut 21 fastening. Thus inflator 18 is housed in and mounted on housing 13 together with the folded airbag 26.

Thereafter, if connector 22 having lead wire 23 joined thereto is connected to inflator body 19, then column cover 8 is attached to column body 4, knee-protecting airbag apparatus S is mounted on the vehicle.

After airbag apparatus S is mounted on the vehicle, if an actuating signal is fed to inflator body 19 via lead wire 23, inflation gas is discharged from gas discharge ports 19a of inflator 18, and the gas is supplied to airbag body 27 via gas outlet ports 34 of inner tube 33. Then airbag 26 inflates and breaks the wrapping member, pushes door 9 formed on column cover 8, and breaks breakable portion 11 so that door 9 opens around the hinge portion 10. Thus airbag 26 deploys as indicated by double-dotted lines in FIGS. 1 and 4, and solid lines in FIGS. 13 and 15.

In knee-protecting airbag apparatus S according to the present invention, in the folding work of airbag 26, front region 32 of airbag 26 to be deployed forward of inflator 18 at the complete airbag inflation is folded in such a manner as to insert the front end 32a of front region 32 i.e. boundary region of column cover side wall 29 and driver's side wall 28, in between inflator 18 and driver's side wall 28. With this arrangement, when the inflation gas is discharged from inflator 18, airbag 26 admits inflation gas, projects from opening 13a provided by the opening of door 9 located below housing 13, and starts to inflate in such a manner as to push out forwardly inserted portion 37 formed in between inflator 18 and driver's side wall 28, while unfolding the inserted portion 37 (FIGS. 11A, 11B, 12A and 12B). Then airbag 26 completes inflation and covers lower side 8a of column cover 8.

In other words, in the initial stage of deployment projecting from opening 13a, airbag 26 inflates in such a manner as to project forward along lower side 8a of column cover 8, and then starts to increase its thickness in the state where it is considerably unfolded forward (FIGS. 11A, 11B, 12A and 12B). That is, making inserted portion 37 projected forward conduces to suppress airbag 26 from protruding rearward i.e., toward knees KL and KR of driver MD in the initial stage of airbag inflation. Thereafter, airbag 26 completes inflation in the state where it is considerably unfolded forward and with suppressed rearward speed. As a result, airbag 26 is prevented from unduly pressing knees KL and KR of driver MD in the initial stage of inflation, and covers the lower side 8a of column cover 8 over a wide range for protecting knees KL and KR smoothly.

With the knee-protecting airbag apparatus S according to the present invention, therefore, rearward protruding amount (volume, height) and protruding speed of airbag 26 is restrained in the initial stage of airbag inflation, and knees KL and KR of driver MD are smoothly protected by the completely inflated airbag 26.

In airbag apparatus S, when airbag 26 is folded and housed, left and right side regions of airbag 26 or airbag body 27 are folded back on column cover side wall 29 on generally longitudinal creases so that the lateral width of airbag 26 is reduced. With this arrangement, when unfolding, left end region 27a and right end region 27b of airbag body 27 are prevented from projecting toward driver MD. More specifically, referring to FIGS. 14A, 14B and 15, left and right folded portions 40 (FIG. 10C) unfold at a front side proximate column cover 8 and away from driver MD, and then inflates with inflation gas in a laterally extended manner. Accordingly, left end region 27a and right end region 27b of airbag body 27 do not project toward driver MD. In addition, it is also prevented that a central region of airbag 26 in the lateral direction thickly inflates and presses knees KL and KR of driver MD unduly in such a manner as to open the knees rearward.

Figure 14A:
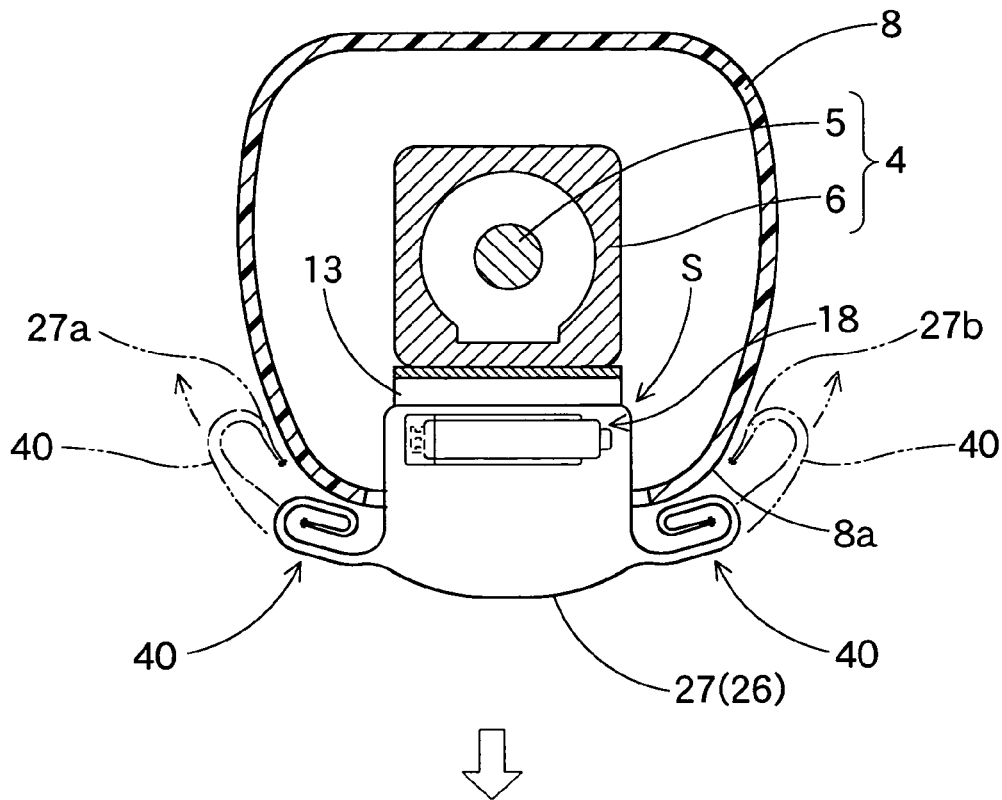
FIGS. 14A, 14B and 15 schematically illustrate the inflation process of the airbag of FIG. 5 in order, by sectional views taken along the lateral direction of vehicle.
Figure 14B:
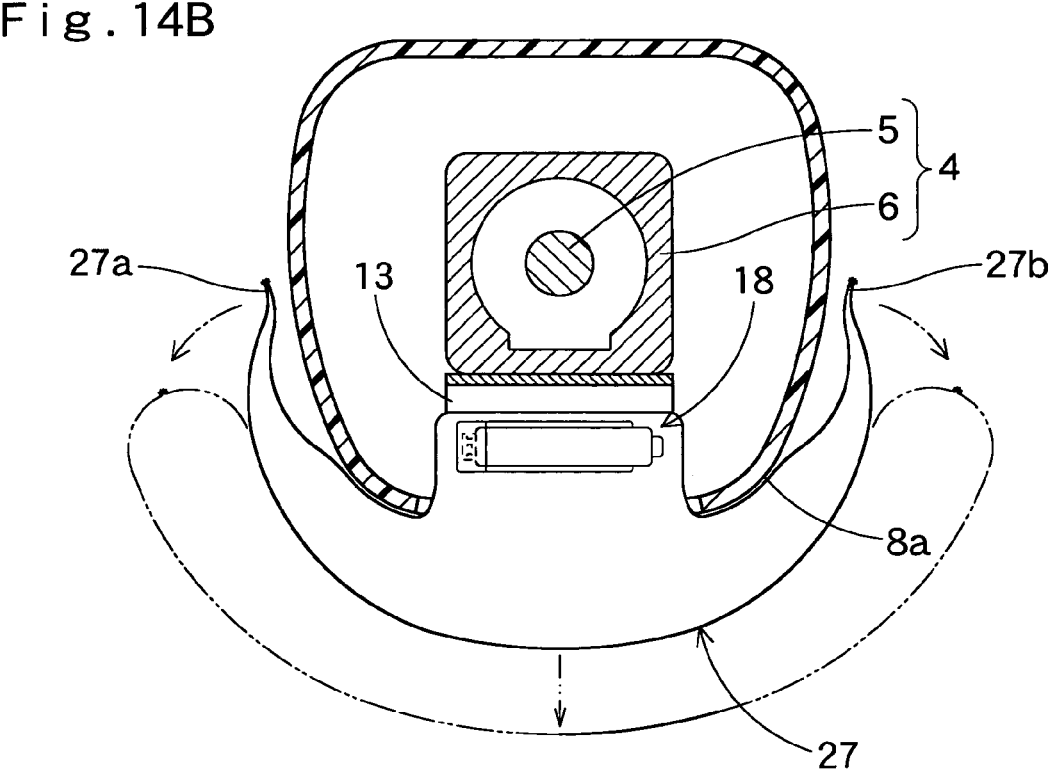
Figure 15:
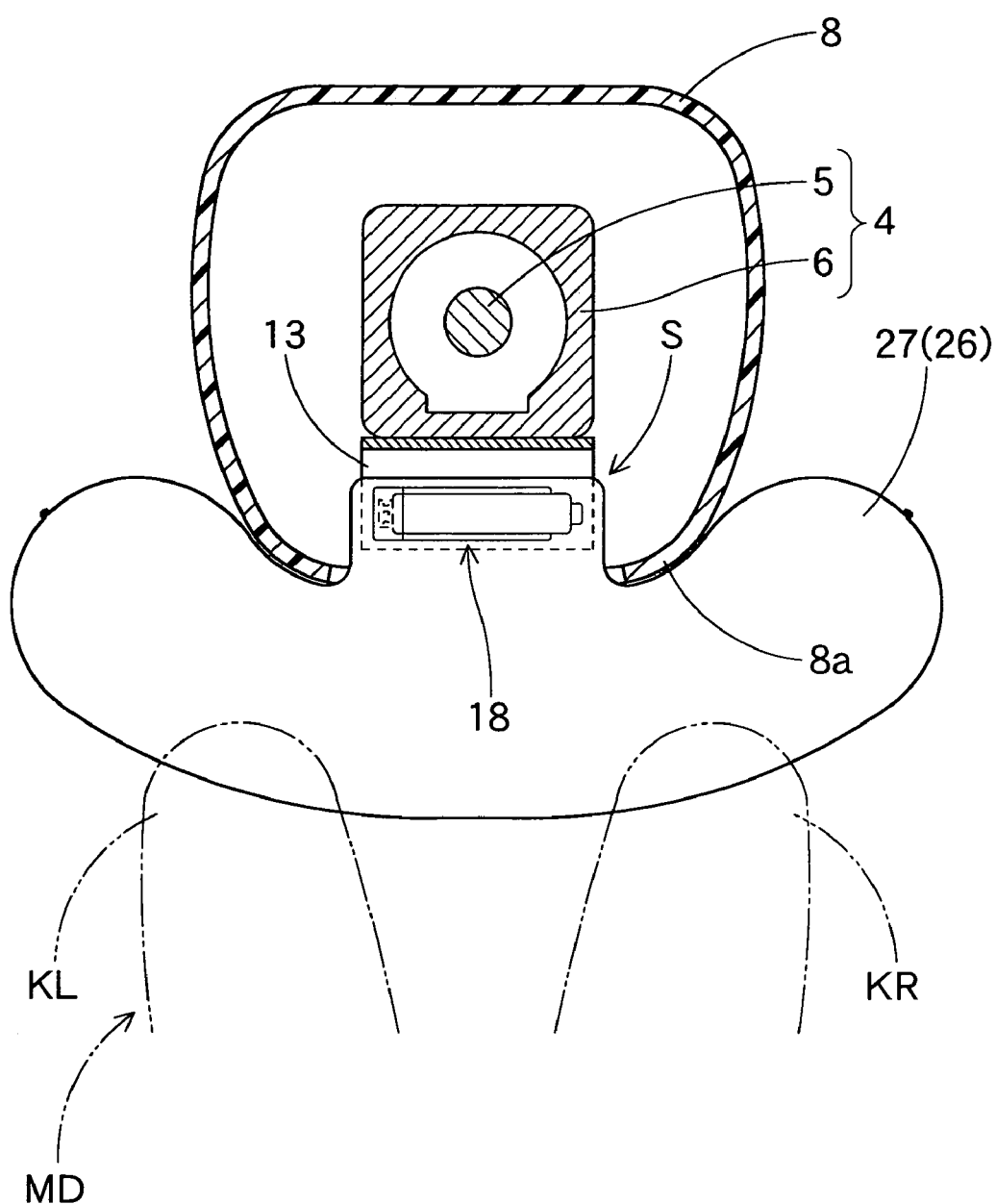

Especially in the foregoing embodiment, left side region and right side region of airbag body 27 are folded from left end 27a and right end 27b on column cover side wall 29 in a rolling manner. With this arrangement, upon airbag deployment, folded portions 40 unroll along lower side 8a of column cover 8 and expand over a wide range in the lateral direction in a thin and uninflated state as shown in FIGS. 14A and 14B. Then as shown in FIG. 15, airbag 26 inflates thickly with inflation gas. This arrangement is advantageous since airbag 26 is prevented from projecting toward driver MD upon deployment. If this advantage is not considered, the folding method of folded portions 40 should not be limited to the method described above, but any other folding method including bellows-folding where the left and right side regions of airbag body 27 are folded on column cover side wall 29, or folding where the left and right regions of airbag body 27 are folded back on column cover side wall 29 will be appreciated.

Moreover, knee-protecting airbag apparatus S includes inner tube 33 inside airbag body 27. Upon airbag deployment, when inflation gas G is discharged from inflator 18, the gas inflates inner tube 33 firstly, and then is let out into airbag body 27 from left and right outlet ports 34 of inner tube 33, while being redirected toward left end 27a and right end 27b of airbag body 27 (FIGS. 5 and 7). Subsequently, gas G is directed to front side and rear side portions of airbag body 27, i.e. front region 32 and rear region 30. That is, inner tube 33 prevents inflation gas G from being fed to the rear side portion of airbag body 27 directly. Moreover, since inner tube 33 guides gas G toward the lateral direction when supplying the gas G into airbag body 27, airbag 26 or airbag body 27 is expanded over a wide range in the lateral direction in the initial stage of airbag inflation. In addition, in the initial stage of inflation, the thickness of airbag 26 (airbag body 27) equates with that of the inflated inner tube 33. That is, inner tube 33 securely prevents airbag 26 from inflating thickly in the initial stage of inflation, and pressing knees KL and KR of driver MD unduly.

Especially in the foregoing embodiment, as shown in FIG. 10B, gas outlet ports 34 of inner tube 33 are located to the lateral ends of airbag body 27 with respect to creases C positioned farthest to the lateral ends out of the creases for forming folded portions 40. With this arrangement, in the initial stage of airbag inflation, the inflation gas is suppressed from being further fed inside until folded portions 40 almost completes unfolding, which allows folded portion 40 to unfold in an as thin state as possible.

Inner tube 33 is constructed such that width W2 of the vicinity of the center in the lateral direction is greater than the width W3 of the vicinity of outlet ports 34 when inner tube 33 is flattened, i.e., the inner diameter of the central portion of inner tube 33 in the lateral direction is greater than that of the vicinity of outlet ports 34 when inner tube 33 is completely inflated. With this construction, when inner tube 33 inflates with inflation gas in the initial stage of airbag inflation, the central portion of inner tube 33 or central portion 33a stably bulges since left and right outlet ports 34 are narrow. Accordingly, a central portion of inserted portion 37 in the lateral direction increases its thickness, too, which allows inserted portion 37 to unfold and inflate smoothly from lateral end regions to the central region. Moreover, since the central portion of inner tube 33 in the lateral direction or central portion 33a inflates largely and stably, airbag 26 will protect knees KL and KR of driver MD with sufficient cushioning property in the event that airbag 26 butts against knees K in the initial stage of airbag inflation.

Figure 11A:
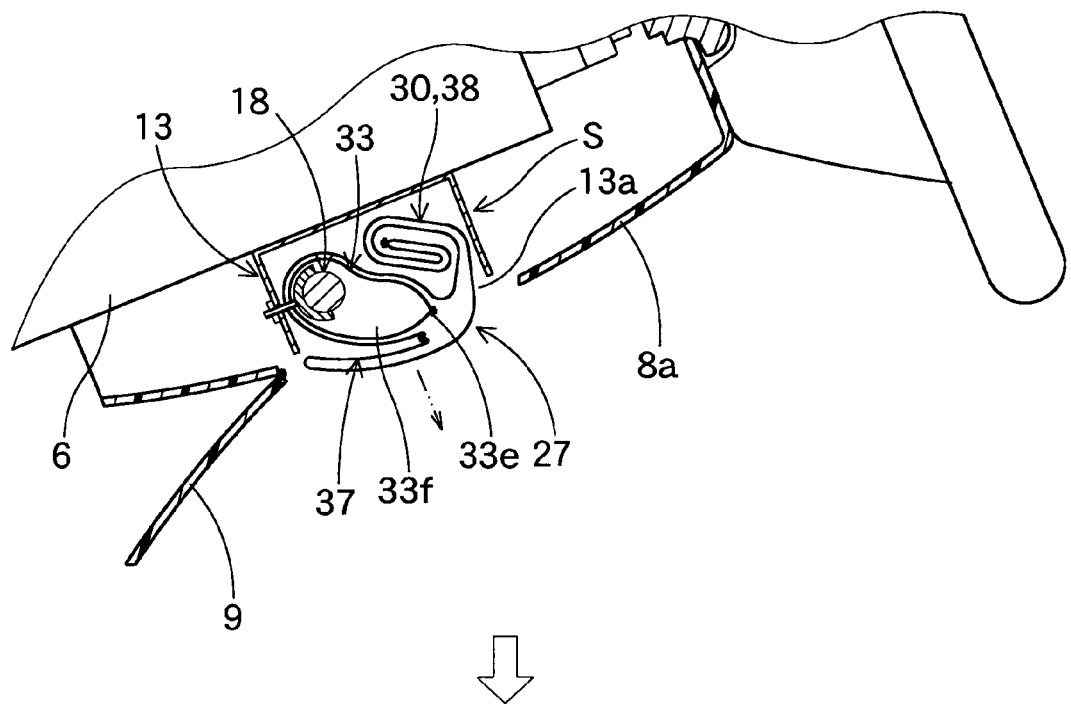
FIGS. 11A, 11B, 12A, 12B, 13A and 13B schematically illustrate the inflation process of the airbag of FIG. 5 in order, by sectional views taken along the longitudinal direction.
Figure 11B:
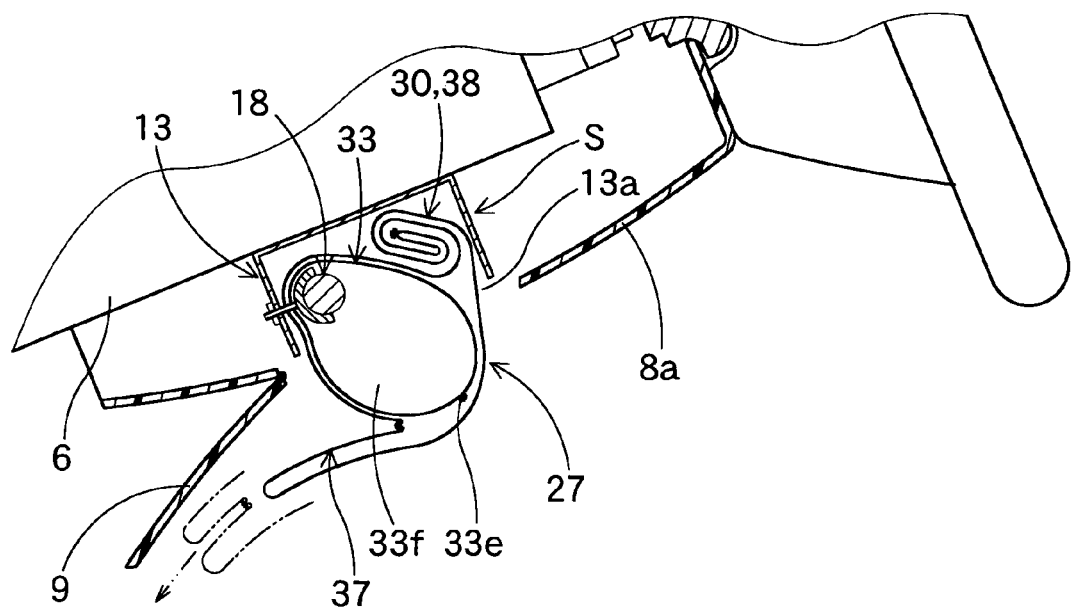

Furthermore, inner tube 33 is located inside airbag body 27 such that its front region 33f is arranged between inserted portion 37 and column cover side wall 29 with its front end 33e oriented rearward (FIG. 9B), and inner tube 33 is folded up in that state together with airbag body 27. That is, inner tube 33 is disposed inside the folded-up airbag body 27 with its front end 33e oriented rearward. With this arrangement, the left and right gas outlet ports 34 of inner tube 33 are positioned at as rear side as possible of inserted portion 37. Accordingly, in the initial stage of airbag inflation, the inflation gas discharged from inflator 18 is fed forward at the vicinity of the rear end of inserted portion 37 through opposite outlet ports 34, which pushes inserted portion 37 out forward. In other words, referring to FIG. 11A, in the initial stage of airbag inflation, front region 33f of inner tube 33 inflates firstly, and then as shown in FIG. 11B the inflated front region 33f pushes inserted portion 37 out forward, so that inserted portion 37 is largely developed forward while projecting downward from opening 13a. Consequently, in the airbag apparatus S, inserted portion 37 is swiftly developed in the initial stage of airbag inflation.

Figure 12A:
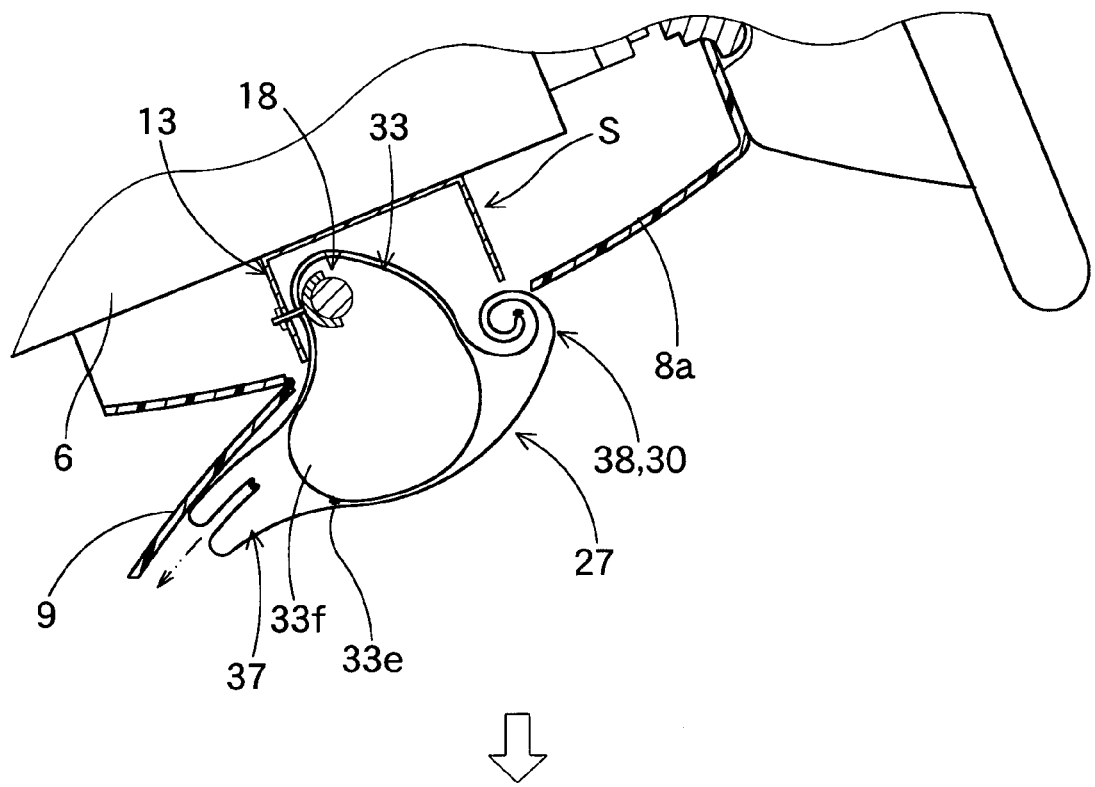
Figure 12B:
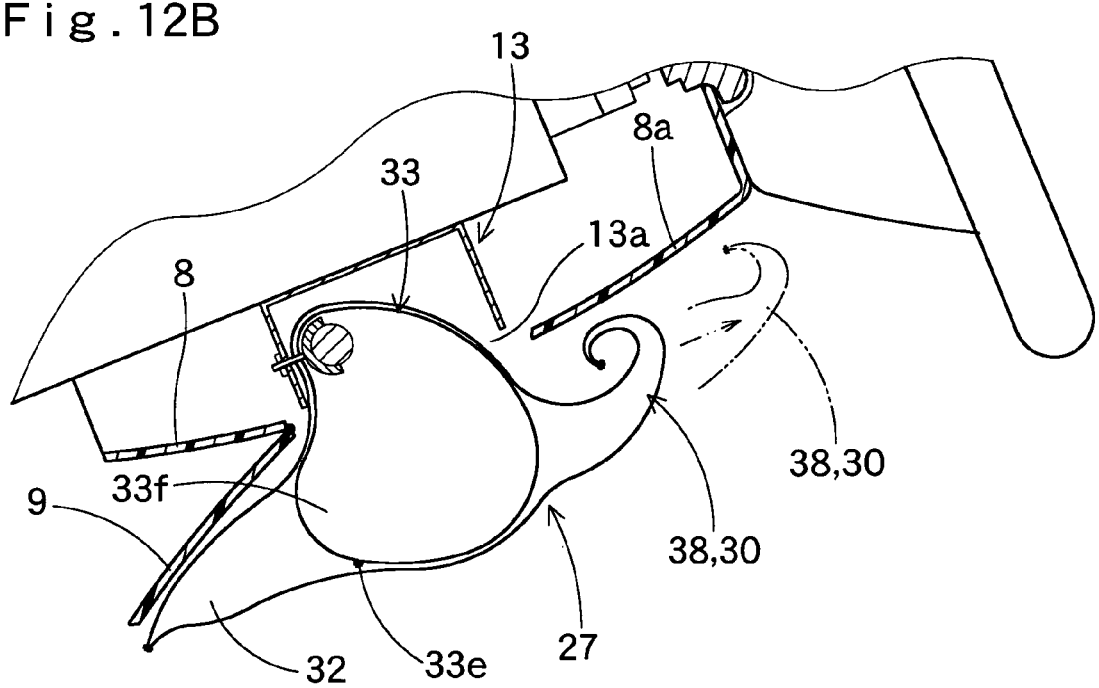

In addition, in the folding work of airbag 26, rear region 30 of airbag 26 or airbag body 27 is folded in a rolling manner on column cover side wall 29 and roll-folded portion 38 is placed above front region 33f of inner tube 33. In the foregoing embodiment, airbag 26 is folded and housed in housing 13 in the state where the front portion of roll-folded portion 38 is placed above front region 33f of inner tube 33 with column cover side wall 29 disposed therebetween (FIG. 10B). In other words, front region 33f of inner tube 33 is located below roll-folded portion 38 when airbag 26 is folded and housed. With this arrangement, in the initial stage of airbag inflation, when inner tube 33 is inflated with inflation gas, its front region 33f presses roll-folded portion 38 upward as shown in FIGS. 11A and 11B, so that roll-folded portion 38 is temporarily held from unfolding. Then as shown in FIG. 12A, after inserted portion 37 unfolds and front region 33f of inner tube 33 projects forward from opening 13 of housing 13 while unfolding, roll-folded portion 38 projects downward from opening 13a and starts to deploy. When projecting downward and unfolding, roll-folded portion 38 in turn helps push out inserted portion 37 forward cooperatively with front region 33f of inner tube 33, thereby promoting the swift development of inserted portion 37. As a result, in the initial stage of airbag inflation, rear region 30 of airbag 26 i.e. protection portions 31 are prevented from projecting toward knees KL and KR of driver MD although it is disposed rearward of inflator 18.

Especially in the foregoing embodiment, rear region 30 of airbag 26, i.e. protection portions 31 (31L and 31R) are folded in a rolling manner from rear edges 31a on column cover side wall 29. Upon airbag deployment, protection portions 31 thus folded unfold along lower side 8a of column cover 8 in a thin state, and then start to admit inflation gas to increase thicknesses (FIGS. 11A, 11B, 12A, 12B, 13A and 13B). Therefore, airbag body 27 is capable of being developed widely in the longitudinal direction in a thin state and then inflates thickly with inflation gas, so that protection portions 31 securely protect knees KL and KR of driver MD without pressing them unduly.

What is claimed is:

1. A knee-protecting airbag apparatus comprising an airbag folded and housed in a lower side of a column cover covering a steering column and an inflator for supplying inflation gas to the airbag, when fed with inflation gas from the inflator, the airbag projecting from a housing disposed in the lower side of the column cover and developing and inflating such that it covers the lower side of column cover for protecting knees of a driver, the inflator being housed inside the airbag at a position to be a generally middle position in the longitudinal direction of the airbag when the airbag is completely inflated, the airbag including a column cover side wall deployed toward the column cover and a driver's side wall deployed toward a driver's seat, respectively upon airbag deployment, and is attached to the housing at the side of the column cover side wall using the inflator, and in the airbag folded up to reduce the longitudinal width of the airbag, a front region of the airbag to be deployed forward of the inflator at a complete inflation of airbag is folded in such a manner as to insert a front end of the front region which front end corresponds to a boundary region of the driver's side wall and column cover side wall in between the inflator and the driver's side wall, thereby providing an inserted portion, the front region being inserted to an inside of the airbag between the inflator and the driver's side wall so as to turn the front end of the front region inside out and rearward in the airbag folded up.

2. The knee-protecting airbag apparatus according to claim 1, wherein:

the lateral width of the airbag at the complete inflation is greater than the lateral width of the housing; and when the airbag is folded and housed, the lateral width of the airbag is reduced by folding back a left side region and a right side region of the airbag on the column cover side wall on a crease extending generally along the longitudinal direction.

3. The knee-protecting airbag apparatus according to claim 2, wherein the left side region and right side region of the airbag are folded in a rolling manner from end portions thereof on the column cover side wall.

4. The knee-protecting airbag apparatus according to claim 1, further comprising a generally tubular inner tube formed of a flexible sheet material and disposed inside the airbag to enclose the inflator, the inner tube being arranged along generally lateral direction when the airbag is completely inflated and including outlet ports at left and right ends of the inner tube for emitting the inflation gas discharged from the inflator.

5. The knee-protecting airbag apparatus according to claim 2, further comprising a generally tubular inner tube formed of a flexible sheet material and disposed inside the airbag to enclose the inflator, the inner tube being arranged along generally lateral direction when the airbag is completely inflated and including outlet ports at left and right ends of the inner tube for emitting the inflation gas discharged from the inflator.

6. The knee-protecting airbag apparatus according to claim 5, wherein the outlet ports of the inner tube are located to the lateral ends of the airbag with respect to creases positioned farthest to the lateral ends out of the creases for folding back the left and right side regions of the airbag on the column cover side wall.

7. The knee-protecting airbag apparatus according to claim 4, wherein:

the inner diameter of a region in the vicinity of the lateral center of the inner tube is greater than the inner diameter of the vicinity of the outlet ports.

8. The knee-protecting airbag apparatus according to claim 4, wherein:

the inner tube comprises a front region positioned forward of the inflator when the airbag is completely inflated; and the inner tube is folded up together with the airbag in a state where the front region is arranged between the inserted portion and the column cover side wall with a front end of the front region oriented rearward.

9. The knee-protecting airbag apparatus according to claim 8, wherein:

when the airbag is folded and housed, a rear region of the airbag arranged rearward of the inflator at the complete inflation of the airbag is folded in such a manner as to bring a rear end of the rear region close to the inflator, and the rear region thus folded is disposed above the front region of the inner tube.

10. The knee-protecting airbag apparatus according to claim 9, wherein the rear region of the airbag arranged rearward of the inflator at the complete inflation of the airbag is folded in a rolling manner from the rear end on the column cover side wall.

11. The knee-protecting airbag apparatus according to claim 2, wherein, after the front end of the front region is turned rearward and inserted to the inside of the airbag between the inflator and the driver's side wall, left and right protection portions are respectively folded from rear edges on the column cover side wall on generally lateral creases to form a roll-folded portion.

* * * * *